No. 867,112. PATENTED SEPT. 24, 1907.
M. CONNOR.
AUTOMATIC AQUARIUM AND FLUSHING DEVICE.
APPLICATION FILED MAR. 22, 1905.
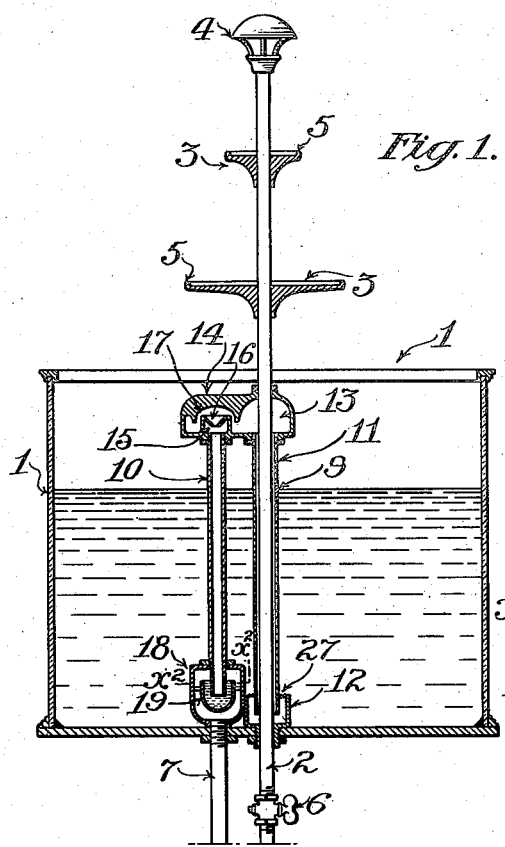
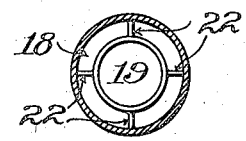
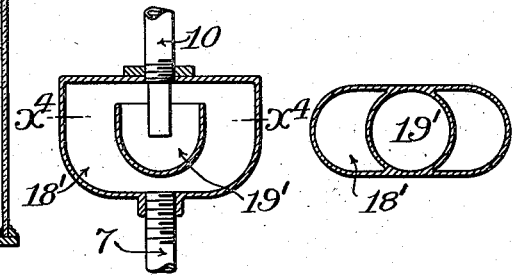
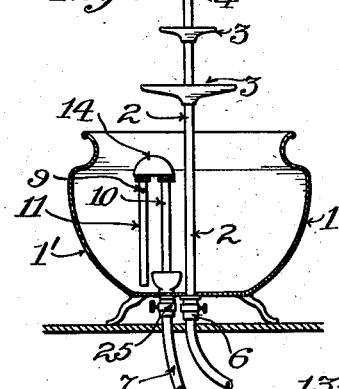
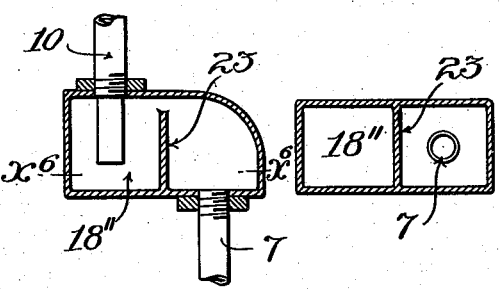
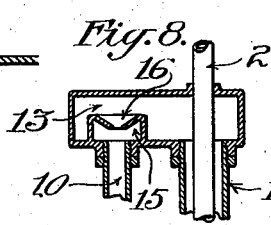
Witnesses:-
Frank H. Graham
A. P. Knight
Inventor:
Mark Connor
by Townsend Bros.
his attys.

UNITED STATES PATENT OFFICE.

MARK CONNOR, OF LOS ANGELES, CALIFORNIA.

AUTOMATIC AQUARIUM AND FLUSHING DEVICE.

No. 867,112.  Specification of Letters Patent.  Patented Sept. 24, 1907.

Application filed March 22, 1905. Serial No. 251,362.

*To all whom it may concern:*

Be it known that I, MARK CONNOR, a subject of the King of Great Britain and Ireland, residing in the city of Los Angeles, county of Los Angeles, and State of California, United States of America, have invented a new and useful Automatic Aquarium and Flushing Device, of which the following is a specification.

The main object of the invention is to provide an aquarium in which the water will be automatically renewed or replenished so that it will always be fresh.

A further object of the invention is to provide an automatic aquarium of simple construction and attractive appearance.

Another object of the invention is to insure that the temperature of the water in the aquarium will not be subject to sudden change by the entering water.

A further object of the invention is to provide an automatic flushing device for this and other purposes which will have a maximum period of operation for a given size of apparatus.

The accompanying drawings illustrate the invention, and referring thereto:—

Figure 1 is a vertical section of one form of the aquarium. Fig. 2 is a detail horizontal section on line $x^2-x^2$, in Fig. 1. Fig. 3 is a detail vertical section of a modified form of the lower water seal. Fig. 4 is a horizontal section on line $x^4-x^4$ in Fig. 3. Fig. 5 is a vertical section of another form of said water seal. Fig. 6 is a horizontal section on line $x^6-x^6$, in Fig. 5. Fig. 7 is a side elevation of another form of the aquarium. Fig. 8 is a detail section of another form of the siphon device.

1 designates an aquarium tank, and 2 the water supply pipe leading upwardly through the bottom of said tank and preferably extending above the tank, being provided at its upper portion with shelves or water spreading deflectors or tables 3, and at its upper end with a deflector 4 that directs the water downwardly over said tables, the water falling over the edges of the tables in the manner of a fountain. Tables or shelves 3 may have raised rims 5, so as to retain a shallow body of water on each shelf. Inlet pipe 2 may have a valve 6.

7 designates the outlet pipe leading through the bottom of the tank and connected within the tank to a water seal device which siphons off a determined quantity of the water intermittently or periodically. The seal device comprises a lower water seal 18, an upper seal, a pipe 10 connecting said seals and a pipe 11 leading into the upper seal, the pipes 10, 11 forming the two legs of a siphon. Said pipe 11 extends upwardly from near the bottom of the tank, and is open at its lower end. In the form shown in Fig. 1 the tube or pipe 11 surrounds the water inlet pipe 2, and at its lower end extends into a cup 12 surrounding pipe 2 at the bottom of the tank. At its upper end pipe 11 extends into a siphon chamber 13, formed in a fitting 14, which surrounds the pipe 2, and extends laterally to receive the pipe 10. An internal chamber 15 is formed at the bottom of chamber 13, above the upper end of pipe 10, said chamber 15 having a funnel 16 at its top. A hood 17 extends over the funnel 16 and down around chamber 15, on the outside thereof, to form the upper water seal. The lower water seal comprises an external chamber or shell 18 opening at the bottom into outlet pipe 7, and receiving through its top the pipe 10 which extends down into said chamber, and a cup 19 supported in chamber 18, above the opening into pipe 7 and extending up above the bottom of pipe 10, so as to form a trap or seal for said pipe. The pipe 11 has a hole 9 at the desired water level for the aquarium, so as to admit air to said pipe, to break the siphon action when the water falls to that level.

The operation is as follows:—Valve 6 is opened, allowing water to flow through the pipe 2, the water falling from the outlet at the top of the pipe and falling over the tables 3. As the tank fills, the water will rise in pipe 11 and will eventually reach chamber 13 and will flow over the wall surrounding chamber 15, and enough will run down pipe 10 to fill the seal cup 19. The funnel 16 at top of chamber 15 acts to restrain the flow of water into pipe 10 and to enable the air to pipe 10 to be compressed by the incoming water without forcing its way back into chamber 15. Water will then continue to flow into chamber 13 until the air therein is sufficiently compressed to cause it to force its way out through the seal at 19, thereby allowing the siphon to fill with water, whereupon the water will be siphoned off from the tank until the level reaches the hole 9. Air will then enter said hole to break the siphon and the siphon will be emptied. Then as the water continues to flow into the tank the above described operation is repeated, except, that the water seal at 19 is now already filled ready for operation.

The device may be variously modified. Thus, the water seal chamber and cup may be round as indicated at 18, 19 the cup being supported by radial webs 22 in Fig. 2 or the said chamber may be elongated as shown at 18', 19' in Figs. 3 and 4, the cup being formed thereon, or the cup may be formed by a wall 23 in the seal chamber 18'' as shown in Figs. 5 and 6. The tank may be of any desired form, preferably with transparent walls. It may be cylindrical as in Fig. 1, or more or less globe shaped, as shown at 1', in Fig. 7. In the last named figure, the outflow pipe 11 is off to one side, instead of around the inlet pipe 2. A valve 25 may be provided for the outlet pipe 7, as shown in this figure. The pipe 11 may either open directly into the tank, adjacent to the bottom thereof, as shown in Fig. 7, or it may extend as above stated into a cup 12 which serves to prevent undue suction into the pipe. This would be especially desirable in case of fish hatching aquariums, as this cup would decrease the liability of small fish being drawn into the waste pipe, and to further safeguard against this a wire gauze screen or strainer may be arranged over said cup, as shown at 27 in Fig. 1. The hood 17 in the siphon chamber 13 may be omitted, as shown in Fig. 8.

What I claim is:—

1. An automatic flushing device comprising a tank, a water supply connection therefor, and an outlet connection comprising a siphon with a water seal chamber at the lower end of its discharge leg and a funnel at the top of said leg.

2. An automatic flushing device comprising a tank, a water supply connection therefor, a siphon chamber, a pipe extending downwardly from said chamber and opening at its lower end into the tank, and another pipe extending downwardly from the siphon chamber, a funnel at the top of the last named pipe, a cup below the bottom of said pipe, a chamber surrounding said cup, and an outlet connection from the last named chamber.

3. An automatic flushing device comprising a tank, a water supply connection therefor, a siphon chamber, a pipe extending downwardly from said chamber and opening at its lower end into the tank, and another pipe extending downwardly from the siphon chamber, a funnel at the top of the last named pipe, a hood over said funnel, a cup below the bottom of said pipe, a chamber surrounding said cup, and an outlet connection from the last named chamber.

4. An automatic flushing device, comprising a tank, a water supply connection therefor, and an outlet connection comprising a siphon chamber having two downwardly extending legs, one of said legs communicating with the tank near the bottom thereof and the other of said legs having an outlet at the bottom provided with a water seal, said siphon chamber being formed at its bottom with a chamber at the top of the second named leg and a funnel at the top of and communicating with said chamber.

5. An automatic flushing device, comprising a tank, a water supply connection therefor and an outlet connection comprising a siphon chamber having two downwardly extending legs, one of said legs communicating with the tank near the bottom thereof and the other of said legs having an outlet at the bottom provided with a water seal, said siphon chamber being formed at its bottom with a chamber at the top of the second named leg and a funnel at the top of said chamber, and said siphon chamber having a hood extending downwardly over and around said funnel.

In testimony whereof, I have hereunto set my hand at Los Angeles California this 8th day of March 1905.

MARK CONNOR.

In presence of—
ARTHUR P. KNIGHT,
TILLIE E. ADAM.